(12) United States Patent
Kesselman

(10) Patent No.: US 7,256,358 B2
(45) Date of Patent: Aug. 14, 2007

(54) ELECTRONIC SCALE WITH OVERLOAD INDICATION ON DISPLAY SCREEN

(76) Inventor: Joshua D. Kesselman, 1580 Rand Ave., Vancouver BC (CA) V6P 3G2

( * ) Notice: Subject to any disclaimer, the term of this patent is extended or adjusted under 35 U.S.C. 154(b) by 0 days.

(21) Appl. No.: 11/380,433

(22) Filed: Apr. 27, 2006

(65) Prior Publication Data

US 2007/0074910 A1  Apr. 5, 2007

Related U.S. Application Data

(60) Provisional application No. 60/723,799, filed on Oct. 5, 2005.

(51) Int. Cl.
*G01G 23/36* (2006.01)
(52) U.S. Cl. ..................... 177/177; 340/666
(58) Field of Classification Search ................ 340/666, 340/667; 177/136–139, 141, 177
See application file for complete search history.

(56) References Cited

U.S. PATENT DOCUMENTS

| | | | | | |
|---|---|---|---|---|---|
| 4,852,674 | A | * | 8/1989 | Gudat | 177/141 |
| 5,167,289 | A | * | 12/1992 | Stevenson | 177/141 |
| 5,780,782 | A | * | 7/1998 | O'Dea | 177/136 |
| 5,844,474 | A | * | 12/1998 | Saling et al. | 340/440 |
| 6,354,996 | B1 | * | 3/2002 | Drinan et al. | 600/300 |
| 7,057,537 | B2 | * | 6/2006 | Lee et al. | 341/61 |
| 2005/0134443 | A1 | * | 6/2005 | Hottebart et al. | |

\* cited by examiner

*Primary Examiner*—Randy W Gibson
(74) *Attorney, Agent, or Firm*—Christine Q. McLeod; Beusse Wolter Sanks Mora & Maire

(57) ABSTRACT

An electronic scale comprising a display screen for digitally displaying the weight of an object, a processing device for controlling the scale and the display screen, wherein the display screen displays an indication of weight relative to overload.

19 Claims, 3 Drawing Sheets

ELECTRONIC SCALE WITH OVERLOAD INDICATION ON DISPLAY SCREEN

CROSS-REFERENCE TO RELATED APPLICATIONS

This application claims priority from U.S. provisional application Ser. No. 60/723,799, filed Oct. 5, 2005, the disclosure of which is incorporated herein by reference in its entirety.

FIELD OF THE INVENTION

The present invention relates to a scale capable of providing a digital display of an object's weight as well as a graphical display feature for indicating weight relative to overload of the scale.

BACKGROUND OF THE INVENTION

There are a number of patents for digital scales. Current scales generally employ sensing devices such as transducer load cell assemblies or piezoelectric sensors for measuring the weight, an analog to digital converter for converting the sensed signal into digital format, and a microcomputer for receiving the A/D converted data and displaying the digital representation onto a digital display, such as an LCD display. Scales of this type are generally known both as regards their construction and their operation, so that a detailed description can be eliminated.

Typically, with an electronic scale, an object is positioned on a weighing platform, where the weight of the object causes the weighing platform to move downward. The downward force causes the weighing platform to exert a force or pressure on a transducer. The transducer converts the downward force into an analog signal in terms of a voltage or a current having a magnitude, which varies according to the weight of the object.

This analog signal is easily converted for digital display purposes with the use of an analog to digital converter (A/D converter). Essentially, the prior art shows many techniques for performing analog to digital conversion. Primarily, the object of such devices is to respond to an analog signal to provide therefrom a digital code or a digital signal, which can be processed by conventional digital circuitry to eventually activate a digital display, such that, the weight of the object is displayed on the display screen.

When a scale reaches or exceeds its maximum capacity, an overload condition occurs which can produce inaccurate results and, more importantly, damage the scale. Accordingly, there is a need in the art for a means to warn of a potential overload condition for a scale.

BRIEF DESCRIPTION OF THE INVENTION

The digital scale of the present invention solves the above-stated need in the art. Generally, the scale comprises a casing with a weighing platform, for supporting items to be weighed, a display screen, and the electronic components for controlling such. The scale is preferably an electronic scale, where downward forces on the weighing platform are sensed by a transducer that produces an electrical signal indicative of weight. The visual display also includes a graphical display feature for indicating weight relative to overload of the scale. Such an indication will provide a user with adequate warning that the scale's maximum capacity is approaching to help prevent damage to the scale.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1A:
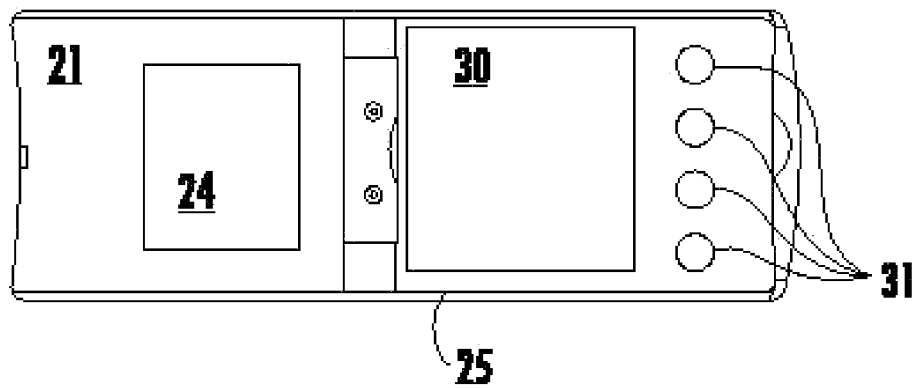
FIGS. 1a-1c depict a sample digital scale.
Figure 1B:
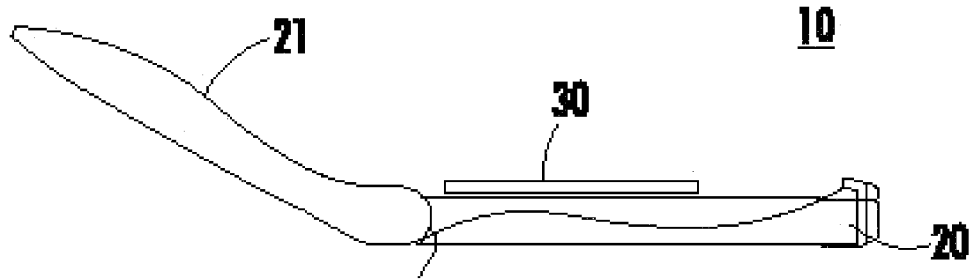
Figure 1C:
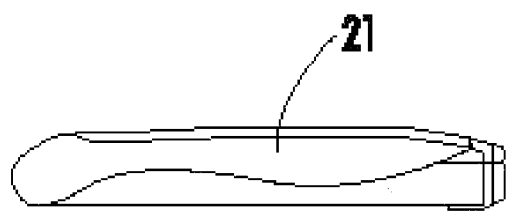
Figure 2:
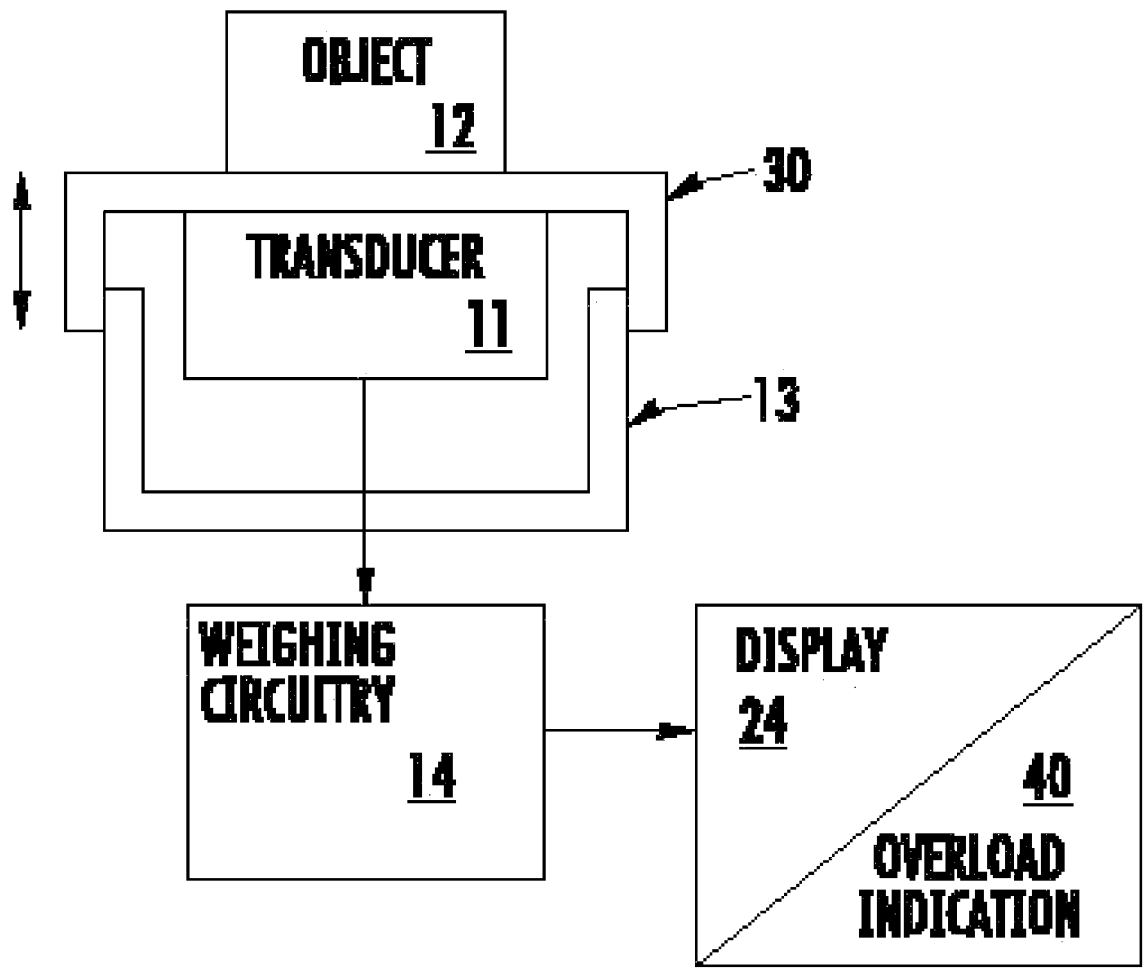
FIG. 2 depicts a block diagram of a sample digital scale.
Figure 3:
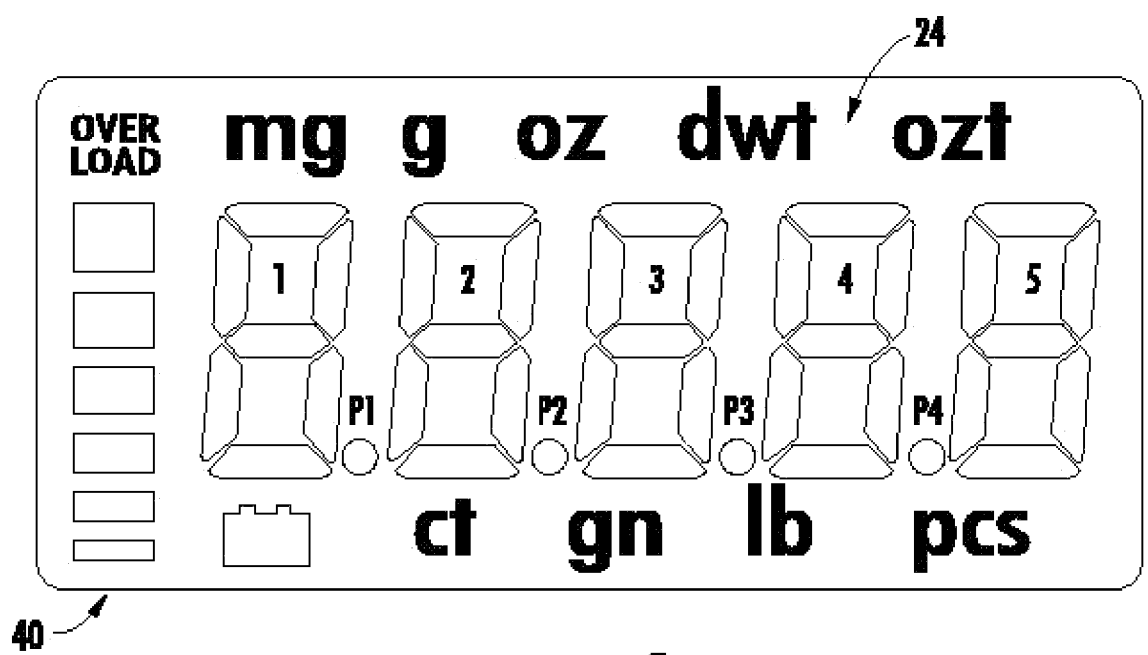
FIG. 3 depicts a sample display screen of the digital scale.

With reference to FIGS. 1-3, the scale 10 of the present invention comprises a casing 20 having a weighing platform 30, for supporting items to be weighed, a display screen 24, for displaying the weight of the objects and an indication 40 of weight relative to overload (wherein overload is the predetermined maximum weight capacity for the scale), and the electronic components for controlling such. The scale 10 may further include a hinged cover 21 that opens on hinges 23. The function keys 31 may be arranged as a matter of design choice. In the example provided, function keys are shown located on the upper surface of the bottom portion 25 of the scale 10 near the weighing platform 30.

An example of a simplified block diagram for an electronic scale is shown in FIG. 2, where the electronic components of the scale 10 are positioned within the case. The scale 10 is preferably an electronic scale 10. As shown, an object 12 is positioned on a weighing platform 30 where downward forces on the weighing platform 30 are sensed by a transducer 11, which produces an electrical signal indicative of weight. The weighing platform 30 is associated with a base member 13, which is positioned on a horizontal reference plane. The object 12 causes the weighing platform 30 to move perpendicular with respect to the plane or base 13. The perpendicular force of the weight of the object 12 causes the weighing platform 30 to exert a force or pressure on a transducer 11 coupled between the weighing platform 30 and the base 13.

The indication of weight relative to overload 40 on the display 24 becomes active while the weight of the object 12 is being determined. In the event the indication of weight relative to overload reaches a predetermined maximum value, "overload" is also displayed. The weighing platform 30 and base member 13 are conventional scale components and many examples of suitable apparatus exist in the prior art and may be used herein.

The transducer 11 or load cell can be a number of different devices for converting a pressure or a force into an electrical signal as known in the art. As such, the transducer 11 may compromise a Wheatstone bridge configuration employing piezoresistive elements or other pressure converting devices to provide a varying electrical signal indicative of the weight of the object 12 on the weighing platform 30. As such, the transducer 11 supplies an analog signal in terms of a voltage or a current having a magnitude which varies according to the weight of the object 12.

This analog signal is converted for digital display purposes with the use of an analog to digital converter (A/D converter). Essentially, the prior art shows many techniques for performing analog to digital conversion, any of which may be used herein. Such devices respond to an analog signal to provide a digital code or a digital signal, which can be processed by conventional digital circuitry to eventually activate a digital display, such that, the weight of the object 12 is displayed on the display screen 24.

Display screen 24 comprises a liquid crystal (LC) with an optional internal lamp, a light-emitting diode (LED), an organic light-emitting diode (OLED), an electroluminescent (EL) device, or other optically sensible display modality that is responsive to electrical stimulation. These display technologies are well known to those skilled in the art of electronics.

Turning now to FIG. 3, in a preferred embodiment, the display screen 24 includes an indication 40 of current weight relative to overload. This indication 40 is preferably displayed graphically based on ratio of the present weight amount to maximum weight capacity of the scale, e.g., 0% (empty), 20%, 50%, etc., up to 100% (overload). The present weight amount is obtained and is then divided by the maximum weight capacity of the scale ("overload threshold") to indicate the weight relative to overload in percentage on the display. The percent weight relative to overload is preferably displayed as an LCD bar graph on the display screen. The bar graph may include a series of segments wherein each segment represents a percentage of maximum weight capacity of the scale. For example, each segment could represent 10% such that when 5 out of 10 segments are displayed, the current weight would be about 50% the maximum capacity of the scale. The segments may also be graduated such that the segments appear wider as the maximum capacity is reached. Similarly, a pie chart could be used to represent weight relative to overload in %. Other suitable forms of indicating current weight relative to overload may also be used. For example, dials, numerical displays, or other graphics.

Moreover, when the object placed on the weighing platform 30 is greater in weight than the scale 10 is capable of handling, the display screen 24 further includes the words OVERLOAD.

Other indications may include audio indications of overload. Similarly, a graduated tone may be used to indicate by sound the current weight relative to overload, for example, getting higher in tone as the current weight approaches overload.

While there has been shown and described what is considered to be a preferred embodiment of the invention, it will, of course, be understood that various modifications and changes in form or detail could readily be made without departing from the spirit of the invention. It is therefore, intended that the invention not be limited to the exact form and detail herein shown and described, nor to anything less than the whole of the invention herein disclosed.

The invention claimed is:

1. An electronic scale for measuring and displaying the weight of a load applied thereto up to a predetermined maximum weight of a scale, comprising a predetermined maximum weight capacity for the scale and a predetermined overload threshold for the scale, chosen to prevent damage to the scale;

a weighing platform for supporting the load to be weighed and producing an electrical signal indicative of weight of the load;

electronic components for comparing the weight of the load to the scale's predetermined maximum weight capacity;

a first display area for numerically displaying the total weight of a load; and means to gauge potential overload condition for a scale which can produce inaccurate results and damage the scale based on the predetermined overload threshold for the scale comprising a second display area for displaying an indication of total weight of the load relative to a predetermined maximum weight capacity for the scale, wherein the indication of total weight of the load relative to the predetermined maximum weight capacity for the scale is displayed graphically to represent the total weight of the load relative to the predetermined maximum weight capacity for the scale, thereby allowing a user to visually gauge a load's proximity to the predetermined maximum weight capacity of a scale to help prevent damage to the scale.

2. A scale as set forth in claim 1, wherein said first display comprises digital display.

3. A scale as set forth in claim 1, wherein said second display comprises digital display.

4. A scale as set forth in claim 1, wherein the indication of weight of the load relative to the predetermined maximum weight for the scale is displayed graphically based on the ratio of the weight of the load relative to the predetermined maximum weight for the scale.

5. A scale as set forth in claim 1, wherein the indication of weight of the load relative to the predetermined maximum weight for the scale is displayed graphically as a percentage of the weight of the load relative to the predetermined maximum weight for the scale.

6. A scale as set forth in claim 1, wherein the indication of weight of the load relative to the predetermined maximum weight for the scale is displayed graphically as an approximate percentage of the weight of the load relative to the predetermined maximum weight for the scale in the form of a bar graph.

7. A scale as set forth in claim 1, wherein the indication of weight of the load relative to the predetermined maximum weight for the scale is displayed graphically as an approximate percentage of the weight of the load relative to the predetermined maximum weight for the scale in the form of a bar graph having a series of segments, each segment representing a fixed percentage of predetermined maximum weight for the scale, such that when the segments are added together, the total number of segments displayed represents the approximate percentage of the weight of the load relative to the predetermined maximum weight for the scale.

8. A scale as set forth in claim 1, wherein the indication of weight of the load relative to the predetermined maximum weight for the scale is displayed graphically as an approximate percentage of the weight of the load relative to the predetermined maximum weight for the scale in the form of a bar graph having a series of segments, each segment representing a percentage of the predetermined maximum weight for the scale, such that when the segments are added together, the total number of segments displayed represents the approximate percentage of the weight of the load relative to the predetermined maximum weight for the scale, and wherein the segments are displayed in a graduated fashion such that the segments appear wider as the predetermined maximum weight for the scale is approached by the load.

9. A scale as set forth in claim 1, wherein the indication of weight of the load relative to the predetermined maximum weight for the scale is displayed graphically as an approximate percentage of the weight of the load relative to the predetermined maximum weight for the scale in the form of a pie chart.

10. A scale as set forth in claim 1, wherein the indication of weight of the load relative to the predetermined maximum weight for the scale is displayed graphically as an approximate percentage of the weight of the load relative to the predetermined maximum weight for the scale in the form of a dial.

11. A scale as set forth in claim 1, wherein the indication of weight of the load relative to the predetermined maximum weight for the scale is displayed numerically as an approximate percentage of the weight of the load relative to the predetermined maximum weight for the scale.

12. A scale as set forth in claim 1, further comprising a third display for indicating that the weight of the load has reached or exceeded the predetermined maximum weight for the scale.

13. The scale as set forth in claim 12, wherein the third display includes text indicating that the weight of the load has reached or exceeded the predetermined maximum weight for the scale.

14. The scale as set forth in claim 12, wherein the third display includes graphics indicating that the weight of the load has reached or exceeded the predetermined maximum weight for the scale.

15. A scale as set forth in claim 1, further comprising an audio indication that the weight of the load has reached or exceeded the predetermined maximum weight for the scale.

16. A scale as set forth in claim 1, further comprising an audio indication in the form of a graduated tone that changes as the weight of the load approaches the predetermined maximum weight for the scale.

17. A method for indicating proximity to overload of a scale by a load due to a scale's predetermined maximum weight of the scale, comprising
 storing a predetermined maximum weight capacity for the scale and a predetermined overload threshold for the scale, chosen to prevent damage to the scale;
 producing an electrical signal indicative of weight of the load;
 numerically displaying the total weight of a load;
 comparing the total weight of the load to the scale's predetermined maximum weight capacity; and
 forewarning of potential overload condition for a scale which can produce inaccurate results and damage the scale based on the predetermined overload threshold for the scale comprising displaying an indication of total weight of the load relative to a predetermined maximum weight capacity for the scale, wherein the indication of total weight of the load relative to the predetermined maximum weight capacity for the scale is displayed as a graphical percentage of the weight of the load relative to the predetermined maximum weight capacity for the scale, thereby allowing a user to visually gauge a load's proximity to overload a scale to help prevent damage to the scale.

18. The method of claim 17, further comprising providing an overload warning by displaying an overload indication when the weight of the load has reached or exceeded the predetermined overload threshold for the scale.

19. An electronic scale for measuring and displaying the weight of a load applied thereto up to a predetermined maximum weight of a scale, comprising
 a weighing platform for supporting the load to be weighed and producing an electrical signal indicative of weight of the load;
 electronic components for comparing the weight of the load to the scale's predetermined maximum weight;
 a first display area for numerically displaying the total weight of a load;
 a second display area for displaying an indication of total weight of the load relative to a predetermined maximum weight for the scale, wherein the indication of total weight of the load relative to the predetermined maximum weight for the scale is displayed graphically to represent the total weight of the load relative to the predetermined maximum weight for the scale, thereby allowing a user to visually gauge a load's proximity to the predetermined maximum weight of a scale to help prevent damage to the scale; and
 an audio indication in the form of a graduated tone that changes as the weight of the load approaches the predetermined maximum weight for the scale.

* * * * *